C. H. TALLMADGE.
MEANS FOR ACCOUNTING.
APPLICATION FILED DEC. 30, 1907.
1,084,668.
Patented Jan. 20, 1914.
4 SHEETS—SHEET 1.
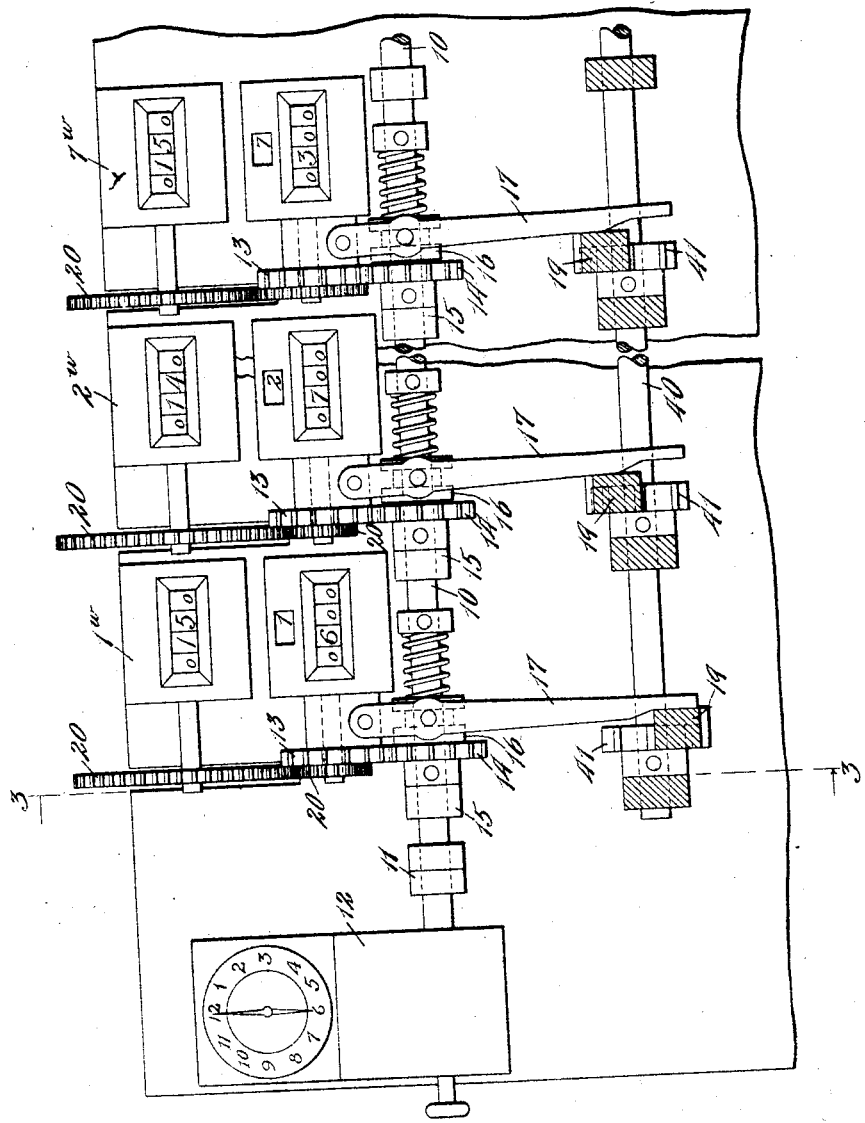
Witnesses:
Ira L. Perry
Leonard W. Novander.
Inventor:
Charles H. Tallmadge
By Brown & Williams
Attys.

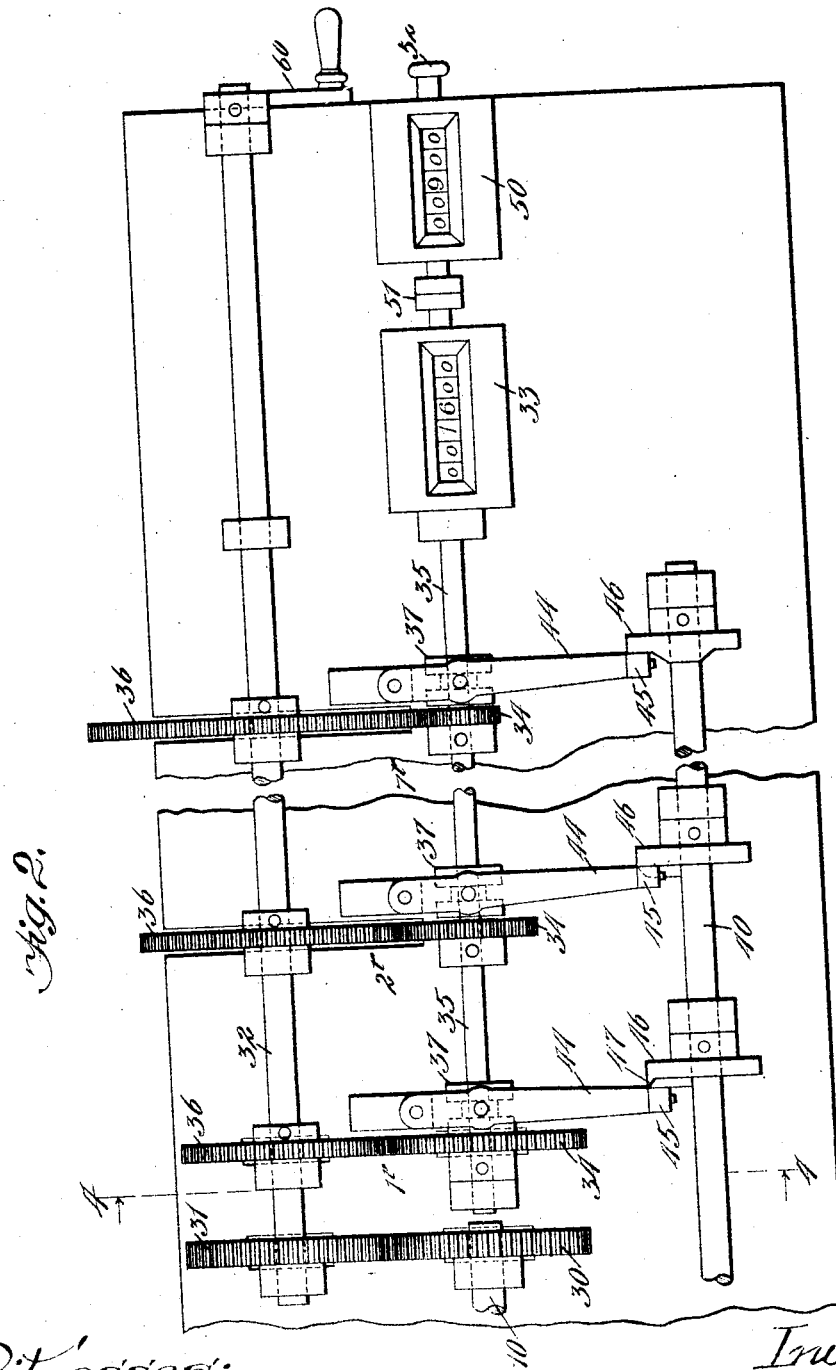

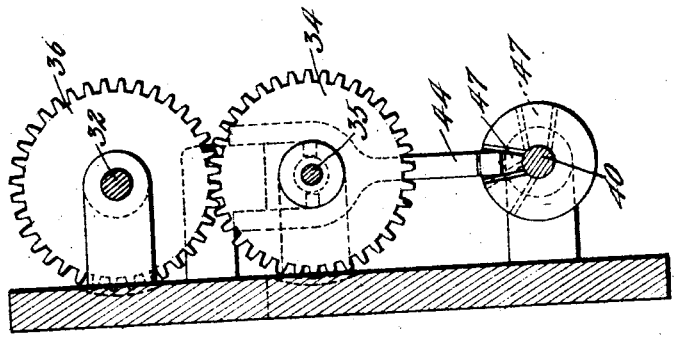
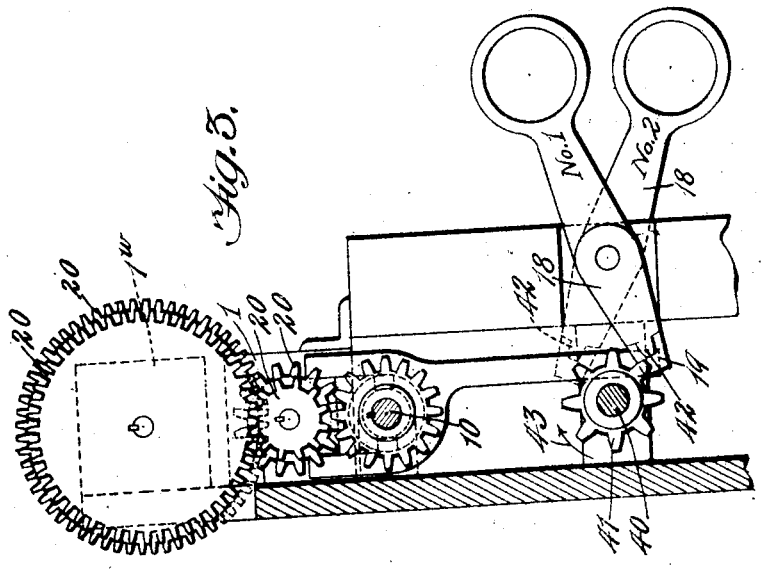

C. H. TALLMADGE.
MEANS FOR ACCOUNTING.
APPLICATION FILED DEC. 30, 1907.

1,084,668.

Patented Jan. 20, 1914.
4 SHEETS—SHEET 4.

Fig. D.

Witnesses:

Inventor:
Charles H. Tallmadge
By
Atty.

UNITED STATES PATENT OFFICE.

CHARLES H. TALLMADGE, OF CHICAGO, ILLINOIS, ASSIGNOR, BY MESNE ASSIGNMENTS, TO WILLIAM R. HEATH, OF BUFFALO, NEW YORK.

MEANS FOR ACCOUNTING.

1,084,668.   Specification of Letters Patent.   Patented Jan. 20, 1914.

Application filed December 30, 1907. Serial No. 408,569.

*To all whom it may concern:*

Be it known that I, CHARLES H. TALLMADGE, a citizen of the United States, residing at Chicago, in the county of Cook and State of Illinois, have invented a certain new and useful Improvement in Means for Accounting, (Case 6,) of which the following is a full, clear, concise, and exact description, reference being had to the accompanying drawings, forming a part of this specification.

My invention relates to means for accounting, and while applicable to various purposes the embodiment of the invention which I shall explain in detail is primarily intended for time-accounting, that is, accounting of the amount of time of the workmen employed in industrial establishments.

Two distinct general methods of securing data for time-accounting have heretofore been employed. In one, each period is ascertained by a direct estimate or measurement of the amount of elapsing time, typically resulting in a simple one-way registration or indication which starts at zero and steadily increases to the full amount of the period, either continuously or by a succession of uniform increments. In the other, each period is ascertained by using an arbitrary starting point, commonly midnight for the shorter periods, as the basis typically for two registrations or entries of opposing natures; the first one, for example, practically debiting a workman with the amount of his "beginning time," say eight hours (at eight o'clock), and the second one crediting him with the amount of his "closing time," say twelve hours (at noon),—from which opposed data may be subsequently calculated his net credit of four hours for actual working time, without directly noting the lapsing.

Although various mechanical aids have been employed in time-accounting, they leave much to be desired. Where beginning and closing times only are recorded, subsequent nettation is necessary to determine the working time; and where lapsing time is registered directly it must usually be translated from indicators or dials, commonly one dial for the hours and another for the minutes. Subsequently, in either case, separate totalization must be performed to get each workman's time for several periods and separate extension to get his wages, and still other totalizations to get the total time and wages of several workmen employed in a department or at a particular job or operation. Most of these nettations, translations, extensions, summations, etc., are peculiarly subject to error, frequently involving the use of the mixed scale of time-notation, its translation into the straight decimal dollar scale and the repeated handling of detached and scattered data. These subsequent operations are usually performed mentally, and even where the use of mechanical aids is extended to them such use commonly involves repeated inspection or other volitional handling of the original or derived data.

One of the general objects of my invention is to secure and indicate the data in an improved manner, as, for example, by showing the actual time worked directly in hours and decimals of an hour, thus avoiding the necessity for reading from pointers and dials or calculating upon the basis of beginning and closing time.

A further general object of my invention is the improved means for handling the data, as, for example, the summation of a plurality of periods for an individual workman, the summation of a plurality of periods for a plurality of workmen, the translation of a workman's time into wages, etc.

Furthermore, my invention provides for the mechanical and current summation and translation of the data, thereby reducing labor and securing more accurate and prompt results than by the means of the prior art.

In carrying out the objects of my invention, as above stated, I prefer to employ the first of the two general methods above indicated; namely, the one-way lapsation-noting method. This simpler and more direct method may be made to yield valuable current information, which is not so easily the case with the method which depends upon two entries of opposed data from which the net working time must be calculated or derived.

The fundamental underlying idea upon which the present invention is based will perhaps be most clearly understood by reference to the accompanying chart or diagram, Figure D, in which the column headed "Men" shows a plurality of workmen, A, B and G, who begin and stop work at the hours noted in the adjoining column headed " In " and " Out ", respectively.

A′ represents graphically, from 0 to 4, the steadily increasing lapsation of A's working time in the forenoon, from seven o'clock "in" till eleven o'clock "out", a total of four hours; and, from 0′ to 3, the similar registration of his time in the afternoon, from two o'clock till five, a total of three hours. B′ and G′ similarly represent the lapsation of the working periods of B and G, respectively from eight o'clock till nine and from ten o'clock till twelve, in the forenoon, with totals of one hour and two hours, respectively; and, for the afternoon, from one o'clock till six, and from three till four, respectively, with afternoon totals of five hours and one hour, respectively. These results are secured by methods and means of the prior art,—rudimentarily by means of the stop watch; and, as applied to time-keeping, by means of the calculagraph (although it should be kept in mind that the latter device does not provide for a second registration or an inspection of the current registration without practically bringing the period to a close; that none of the registrations are visible in the machine but only on the card, and that the indications of the machine itself can not be intelligently connected with the amount of any of the periods which it registers.) It will be noted that neither of these three graphic records represents the registration of the total of a workman's forenoon and afternoon periods, and I am not aware that it is in the prior art to secure this registration mechanically. My first step, therefore, has been to provide for this simple totalization, represented at A$t$, B$t$ and G$t$, where, to describe one only, A$t$ shows A's forenoon record as before, four hours from seven o'clock till eleven; but, instead of starting from 0 in the afternoon, it starts where the forenoon's registration ended, that is, at 4′ (equivalent to four), and adds the three hours (from two o'clock till five) to the four hours, making a total of seven hours for the day. Similarly with B$t$ and C$t$, *mutatis mutandis*.

ABG$s$ is a graphic representation of the totalization, or the synthesization, as I prefer to call it in this connection, of the six more or less intercurrent periods worked by A, B and G for the day, in which the perpendicular dotted line $x$—$y$ represents zero, and the lines at right angles to it represent the total amount of time worked by the three men at the hours shown at the left of the figure, the increment during the last preceding hour being represented by a full line and the balance of the total registration by the dotted portion of the line. These amounts are also indicated by the numbers 1, 3, 4, 6, 7, etc., at the extreme right. The varying inclination of the broken line 0 ... 7 .. 16 from the perpendicular represents the varying rate of the synthesized lapsation; for while the inclined lines at the left are uniform in their inclination for all working men at any given hour, and are also uniform at all working hours for any given man, the synthesizing line 0 ... 7 ... 16 represents the varying rate of the combined lapsation for all the working men. Thus, the section 0—1 under ABG$s$ is a duplication of the first hour's portion of 0—4 under A′ or under A$t$, because only A is working during the hour from seven till eight. But at eight o'clock B begins work, and the double rate of the two men is indicated under ABG$s$ by an increased inclination between 1 and 3. When B stops work at nine o'clock the inclination is reduced to the unitary rate, to agree with the rate of the single working man (A) for that hour. At ten o'clock G begins work, thus again raising the rate under ABG$s$ to double. At eleven o'clock A stops, rendering the ABG$s$ rate unitary again, to agree with the single rate of the one working man G; and at noon, when G stops work and the lapsation of the time with which he is to be credited ceases, the inclination of the ABG$s$ line drops to zero, with a synthesized indication of the time of A, B and G, seven hours, to agree with the several total individual lapsations of time, namely, four, one and two hours. Following the noon interval B commences work at one o'clock, A at two o'clock and G at three o'clock, and the section of the ABG$s$ line from 7′ to 13 indicates the corresponding changes in the rate and amount of the synthesized lapsation. This line from 13 to 16 indicates also the changes in the rate and amount of the synthetic lapsation which accompanies or results from the cessation of work by the several men.

The "synthetic" character of the lapsation represented by ABG$s$ is more clearly contracted with the mere totals at A$t$, B$t$ and G$t$ when we consider the results at the close of the day, when A$t$ shows a total of seven hours, B$t$ six hours and G$t$ three hours, while ABG$s$ shows a grand total of sixteen hours.

Having in mind this diagrammatic representation of the general principles upon which my invention is based and the fact that by varying the rate of entry in a generic or synthetic register, its total registration can be made to correspond at all times with the entries with which the specific registers are being involved, one particular embodiment of means for carrying out my invention as herein described will be readily understood. In general, this mechanism involves a plurality of primary or specific entry-receiving devices or registers, each assigned to a particular workman's time account and each adapted to be operatively connected with a common actuating means, such as a time- or clock-controlled rotating shaft. Though in the specific application of this invention to time-accounting we have to deal with a lapsation which is constant and uniform, it is not necessary for practical purposes that the registrations or entries should be strictly continuous as distinguished from intermittent registrations or entries, provided the intervals are sufficiently minute and regular. Means is provided for connecting any of the primary registers with the common actuating shaft when the workman comes in and for disconnecting the register when he goes out. The rotating shaft therefore involves any connected register with an entry proportional to the period of time during which the register is connected, each entry being mechanically and automatically added to the preceding entries. These registers provide at all times a direct reading indication of the amount of time with which every workman has been credited. The totalization of the workmen's time may go on for the period of a day or a week or a month before the register is set back to zero, if, indeed, it be set back at all.

In order that the entry in the generic or synthetic register may be proportional to the sum of the entries in all of the operatively connected primary or specific registers, no matter how the rate of operation of the common actuating means may vary, I prefer to drive the synthetic register from the common actuating means but through the medium of mechanism for varying the ratio of connection so that the rate at which the synthetic register is driven may correspond at all times with the total of the rates with which the primary registers are concurrently being involved. If, as in this case, the rates at which the individual or specific registers are actuated are equal during any given concurrence, the rate of actuating the generic register must be a multiple of its unitary rate. For example, the actuation of two specific registers at the same rate will require a two-fold rate of actuation for the generic register; if there are three equal concurrent individual registrations the ratio of the total registration must be three-fold—still integral, and so on for any number of equal concurrent individual registrations. The synthesizing ratio must be variant with varying concurrences. It is a practical problem to insure that when the concurrence changes, that is, in this case, when a differing number of equal-rated registrations are concurring, the ratio of the totaling registration shall change to agree with the number of individual registrations. While this requirement may be met in a variety of ways, I have adopted for the present embodiment of the means of my invention a system of change gears, the employment of each set serving to connect the common actuating means in a different ratio with the generic register. Means is provided whereby the connection of any individual register with the actuating shaft automatically throws into service the set of gearing whose ratio corresponds with the number of individual registers operatively connected with the actuating shaft.

It is desirable in some species of registrations to have associated secondary or tertiary registrations in association, each secondary or tertiary register mechanically being in such case connected with its primary in a more or less permanent ratio other than that of equality. It is not necessary nor always desirable that the secondary or tertiary registration shall be at the same ratio to its primary in the case of different primaries. Thus, for example, a series of secondary registers may be associated with the primary registers to take account of the workmen's wages. In case one workman is paid twenty cents, another twenty-five cents and another fifty cents per hour, the primary registrations (of time) must be the same for all workmen during a concurrence of registrations, but the secondary registrations (of wages) must be different. To provide for this fixed variation in wages I associate with each individual time register a wage register operatively connected with and actuated by the common actuating means either directly or through the primary register. These wage registers are so adjusted by gearing or otherwise that the desired ratio between the time and the wage registration may prevail in each workman's pair irrespective of the ratio of any other pair.

The secondary registers being preferably operated only in association with their respective primaries and the primaries only in association with the generic or synthetic register, the preferred method for returning any of them to zero is by reversing the direction of operation of the actuating means (disconnecting the clock-controlling movement) and operating the actuating and transmitting means manually or otherwise with the required primaries connected until the desired reduction to zero is effected. When by this method all of the primaries are cleared and their indications reduced to zero, the generic register will have been returned also to its zero position.

The details of this mechanism for carrying out my invention are illustrated in the accompanying drawings, in which—

Figure 1 is a front elevation of a number of the individual primary registers, their associated secondary registers and the common actuating means and connectors; Fig. 2 is a front elevation of the generic or synthetic registers and the mechanism for controlling the rate of their actuation; Fig. 3 is a cross-sectional view taken in the direction of the arrows on line 3—3 of Fig. 1, and Fig. 4 is a cross-sectional view taken in the direction of the arrows on the line 4—4 of Fig. 2.

The individual primary registers numbered 1, 2 and 7 (the registers 3, 4, 5 and 6 and their associated mechanism being omitted from the drawing as indicated) are assigned respectively to workmen B, A and G. The common actuating shaft 10 is connected through the clutch 11 with the clock-controlled driving mechanism 12. Each of the primary registers is provided with a driving shaft having a driving pinion 13, these pinions meshing with similar gear wheels 14, 14, loosely mounted upon the clock-controlled drive shaft 10. The collars 15 prevent the lateral movement of the driving gears 14 so that the spring actuated friction clutches 16 may, when released, operatively connect the associated driving gears with the driving shaft. These connecting clutches are controlled by the workmen as they enter and leave. It will be noted that each connecting clutch is governed by the controlling lever 17. Associated with each controlling lever there is a cam lever 18. The extension 19 at the inner end of the cam lever serves when the cam lever is in the normal position (as shown in association with registers 2 and 7) to force the associated controlling lever 17 toward the right, thus disengaging the associated connecting clutch from the driving gear. When, however, the cam lever is thrown into its alternative position, as in the case of register No. 1, the extension 19 is moved into a position such that the spring of the clutch may force the clutch into engagement with the driving gear 14, whereupon the motion of the actuating shaft 10 will be transmitted through the gearing to the primary register. The operation of this part of the mechanism of my invention requires that each workman upon entering in the morning throw his cam lever from the normal position into the operative position, thereby connecting his time register with the common actuating shaft. Thereafter each of the connected registers will be driven at a preferably constant and uniform rate, thus involving each register with an entry of the amount of time which elapses before the termination of the period by the return of the associated cam lever to its normal position upon the workman's leaving.

Associated with the time registers there are wage registers, numbered respectively $1w$, $2w$, ... $7w$. These registers are operatively connected by the gear wheels 20, 20, the ratio of gearing corresponding with the rate of wages. Thus, for example, the ratio of the gearing connecting registers 2 and $2w$ corresponds with the rate of twenty cents an hour, the ratio between gearing connecting registers 1 and $1w$ corresponds with the rate of twenty-five cents an hour, while the ratio of gearing connecting registers 7 and $7w$ corresponds with the rate of fifty cents per hour. The apparatus is shown in its condition at the close of a day, six p. m. The indication of $1.50 in the wage register $7w$ corresponds to six hours as indicated in the time register No. 1, multiplied into the rate of wages of twenty-five cents per hour. The indication of $1.40 in the wage register $2w$ corresponds with A's seven hours at twenty cents per hour, and the indication of $1.50 in the wage register $7w$ corresponds with G's three hours at fifty cents per hour.

In considering now the synthesizing or generic register or registers and the mechanism for actuating them at a rate proportional to the number of specific or individual registers which may be connected with the common actuating means, reference may be had to Fig. 2. It will be noted that the common actuating shaft 10 terminates in a gear wheel 30, which is in mesh with a similar gear wheel 31, fixedly mounted upon a counter shaft 32. The generic or synthetic register 33 is adapted to be driven by any one of a number of sets of gears. Each of these sets comprises two gear wheels, one lettered 34, and loosely mounted upon the register driving shaft 35, and the other lettered 36 and rigidly mounted to rotate with the counter shaft 32. The set of gears marked $1r$ is adapted to connect the actuating shaft 10 with the register driving shaft 35 at a one to one ratio. The set marked $2r$ establishes the connection at a one to two ratio and so on to the final set $7r$ which establishes the connection at a one to seven ratio. A friction clutch 37 is associated with each of the sets of gearing so that the actuation of any of these clutches will establish the operative connection of the synthetic register with the actuating shaft 10 at a ratio which depends upon the identity of the clutch which has been actuated. The selection of the clutch to be actuated in establishing this connection is automatically determined by the number of individual registers concurrently connected with the actuating shaft and the means which I have adopted for carrying out this purpose is as follows: A selecting shaft 40 is mounted just to the rear of the cam levers 18. Adjacent to each of the cam levers a spur wheel 41 is mounted upon the selecting shaft. Each of the cam levers is provided with a tooth 42 adapted to mesh with the teeth of the associated spur wheel. It will be apparent that when the cam lever No. 1 was moved from the "out" or normal position to the "in" or operative position, its gear tooth must have engaged with a tooth of the associated spur wheel 41 to cause a one-eighth revolution of the spur wheel and the selecting shaft 40. So also if the cam lever 2 be moved from the "out" to the "in" position, another one-eighth revolution of the selecting shaft in the direction of the arrow 43 will be caused. In like manner the connecting in of any workman's time register will cause a one-eighth revolution of the selecting shaft.

Referring now to the clutch-controlling mechanism for connecting the synthetic register in proper ratio with the actuating shaft, as shown in Fig. 2, it will be seen that each clutch is controlled by a selecting lever 44, each lever being provided at its lower extremity with a roller 45 coöperating with an associated cam. The first of the cam disks 46 is provided with a single elevated cam surface 47, the second disk is provided with a similar cam surface, and so on to the seventh cam disk, but the cam disks are so fixed upon the selecting shaft 40 that the angular position of the cam surfaces shall not correspond in any two of the disks. Under normal conditions, when none of the individual registers is connected with the actuating shaft the cam disks on the selecting shaft are all in positions such that the selective clutches are all released whereby the operative disconnection of the synthetic register from the actuating shaft is maintained until some workman upon coming in throws his cam lever from the normal into the "in" position. As previously explained, this connection of the workman's register with the actuating shaft causes a one-eighth revolution of the selecting shaft, and such revolution is sufficient to bring the first cam disk into a position such that its cam will force the selective lever 44 to the left, thereby connecting the one to one set of the selective gears with the drive shaft 35 of the synthetic register. Thereupon the rotation of the common actuating shaft 10 will cause not only the entry of the hours in the workman's individual register but will cause also the rotation of the synthetic register shaft 35 at the same rate, thereby involving the synthetic register with the entry of the same number of hours as that recorded in the individual register. When, however, another workman comes in and connects his individual register with the actuating shaft, an additional one-eighth revolution of the selecting shaft 40 is caused and such additional rotation causes the disconnection of the one to one gear set but establishes the operative connection of the one to two gear set on account of the actuation of the associated clutch by virtue of the cam surface on the second cam disk coming into a position such as to throw the associated selective lever to the left. The connection of other individual registers with the common actuating shaft causes in like manner a further rotation of the selecting shaft, thereby connecting the synthetic register with the actuating shaft through that set of gears whose ratio corresponds with the number of individual registers connected with the actuating shaft. When any of the workmen goes out he restores his cam lever to its normal position, thereby disconnecting his individual register from the actuating shaft. In so doing, however, the tooth on the cam lever causes a backward one-eighth revolution of the selecting shaft, thereby causing the selection of a set of the selective gears which corresponds with the decreased number of individual registers in connection with the actuating shaft. It will be apparent that this means provides that the rate at which the synthetic register is driven shall correspond at all times with the number of individual registers concurrently in operation due to their connection with the actuating shaft. The sixteen hours which have been recorded in the synthetic register is the total of the number of hours which have been entered in the individual registers during the day.

It is sometimes desirable to provide two or more generic or synthetic registers, and I have indicated in Fig. 2 an additional synthetic register 50, this register being connected with the drive shaft 35 of the main synthetic register 33 by means of the clutch 51. The hand wheel 52 enables the clerk to release the connection at the clutch 51 and to turn the register mechanism back to zero. For example, it may be assumed that the register 50 was thus turned back to zero at the noon hour, whereupon its indication of nine hours at the close of the day corresponds with the total number of hours which have been worked by all of the workmen during the afternoon; the other register having been started from zero in the morning indicates the total number of hours which have been worked by all of the men during the entire day. Manifestly, additional synthetic registers may be connected in like manner for totalizing the registrations of all of the individual registers for greater or less lengths of time or for totalizing the registrations in less than the whole number of registers.

In my present embodiment of this invention I have shown a manually operable crank 60 attached to the counter shaft 32 for restoring the registers to the zero position, as at the close of a day, week or month. It will be apparent that if individual registers 1, 2 and 7 are all connected with the actuating shaft, and if after disconnecting the clock-controlled mechanism at 11 the crank 60 be operated to rotate the actuating shaft 10 in reverse direction, the register 7 will first be restored to zero, since its indication is less than that of the other registers.

Upon reaching the zero position in register No. 7, the cam lever may be thrown to disconnect this register from the actuating shaft. The manual rotation of the actuating shaft may then be continued until the indication in register No. 1 has been reduced to zero, when it may be disconnected. A further backward rotation of the shaft will reduce the indication in register No. 2 to zero. Since the selection of the sets of gears will be accomplished in the same manner during this backward revolution of the actuating shaft as during its forward revolution, the backward rotation and disconnection of the individual registers to restore them to zero will automatically cause the restoration of the synthetic register to zero. In this connection it may be noted that the auxiliary synthetic register 50 may, if desired, be disconnected from the driving shaft 35 during each backward revolution of the actuating shaft, whereupon the subsequent connection of the auxiliary synthetic register after each restoration of the other registers to zero may be made to cause the auxiliary register to continue its totalization indefinitely, while the main synthetic register 33 is periodically restored to zero. Some of the more important advantages of this specific means for carrying out my invention are that an improved indication of a single period of elapsing time is secured, and this direct reading indication may be secured, no matter when the period commences or ends. Furthermore the indication of elapsed time is currently accessible for inspection or other accounting purposes, without bringing the period to a close. By means of my invention I secure a mechanical summation of two or more separated periods of work by an individual employee, each workman's total time being indicated upon his individual register. By means of the synthetic register and the selective operating mechanism I secure a mechanical summation of two or more intercurrent periods worked by several employees. The association of the wage registers with the time registers provides a current mechanically extended indication of a workman's wages for a single period and for a number of periods.

While I have described in detail only the specific method of time-accounting, the scope of my invention is not to be so limited. While herein applied to the registration of time and other movements where the lapsing is constant and uniform in its rate, the general method herein disclosed is equally applicable to other registrations, summations and translations. I do not wish to limit myself, therefore, to the application of my invention to time lapsations as distinguished from any other movements of a nature essentially similar to that of time in respect to capacity for measurement, translation or accounting by this method.

What I claim as my invention is:

1. In combination, a plurality of direct-reading individual time-registers, each adapted to indicate the amount of its total actuations, a clock-controlled actuating mechanism, means for connecting each of the individual registers with the actuating mechanism during the periods of time to be accounted in such register, a direct-reading individual wage-register associated with each time register and operatively connected therewith in a predetermined gear ratio whereby the operation of any time register is accompanied with a corresponding operation of the associated wage register, a synthetic register, and means for automatically connecting said synthetic register with the actuating mechanism in a ratio corresponding with the sum of the rates of operation of one class of individual registers.

2. In combination, a plurality of direct reading individual time registers each adapted to indicate the amount of its total actuations, a clock controlled actuating mechanism, means for connecting each of the individual registers with the actuating mechanism during the periods of time to be accounted in such register, a direct reading individual wage register associated with each time register, and gearing of predetermined ratio between each time register and the associated wage register.

3. In combination, a plurality of direct-reading individual time-registers each adapted to indicate the amount of its total actuations, a clock-controlled actuating mechanism, means for connecting each of the individual registers with the actuating mechanism during the periods of time to be accounted in such register, a synthetic register, and means for connecting the synthetic register with the actuating mechanism in various ratios corresponding with the varying number of individual time registers connected with the actuating mechanism.

4. In combination, a plurality of individual direct reading totalizing registers, each assigned to a different workman's account, means for actuating any of said registers, a clock for controlling the degree of actuation of the registers, a synthetic register, and means for automatically connecting the synthetic register with the actuating means in a ratio of connection corresponding with the number of individual registers concurrently connected with the actuating means.

5. In combination, a plurality of individual registers, a common actuating mechanism, means for connecting any of the individual registers concurrently with the actuating mechanism, a synthetic register, a 15. In combination, a plurality of individual time registers, a clock-governed mechanism for controlling the actuation of any of the time registers connected therewith, means for connecting any of the time registers with the actuating mechanism, a wage register geared to each time register in the ratio of the rate of wages, and means for returning said registers to their zero positions.

16. In combination, a plurality of totalizing registers each assigned to a different workman's account, a uniformly driven actuating mechanism, means for operatively connecting any register with the actuating mechanism during the periods of time for which the workman to whom that register is assigned is to be credited, whereby each register will totalize the workman's credits as earned, and means for synthesizing the entries in all of said registers.

17. In an accounting mechanism, the combination of a time controlled driving shaft, a plurality of individual registers associated therewith, means for operatively connecting any one of said registers or any number thereof with said shaft in a suitable transmission ratio, and a register for indicating the total amount of actuation of the respective individual registers.

18. In an accounting mechanism, the combination of a time controlled driving shaft, a plurality of individual registers associated therewith, means for operatively connecting any one of said registers or any number thereof with said shaft in a suitable transmission ratio, and a register for concurrently indicating the total amount of actuation of the respective individual registers.

19. In combination, a plurality of registers, mechanism for successively clearing said registers, and a totalizer for all the registers adapted to be operated when the registers are cleared.

20. In combination, a time controlled driving mechanism, a plurality of time registers, a plurality of wage registers, means for selectively connecting desired ones of the registers with the time controlled driving mechanism, and a register for totalizing the actuations of the connected registers.

21. In combination, a time controlled driving mechanism, a plurality of time registers, a plurality of wage registers, gearing of predetermined ratio between each time register and an associated wage register, means for selectively connecting desired ones of such registers, and a register for totalizing the actuations of the connected registers.

22. In combination, a time controlled driving mechanism, a plurality of wage registers having predetermined ratios of actuations relatively to the driving mechanism, and means for totalizing the actuations of such registers.

23. In combination, a driving member, a plurality of individual registers each having a separable operating connection of definite ratio with said member, a totalizing register, and mechanism between the totalizing register and the driving member for actuating the totalizing register proportionally to the sum of the actuations of the connected individual registers.

24. In combination, a driving member, a plurality of individual registers, a totalizing register, gearing between the driving member and the totalizing register, and means for maintaining the ratio of said gearing proportional to the sum of the ratios of the connected individual registers.

In witness whereof, I hereunto subscribe my name this 26th day of December A. D. 1907.

CHARLES H. TALLMADGE.

Witnesses:
 Fred. O. Heuser,
 Harvey L. Hanson.

---

Copies of this patent may be obtained for five cents each, by addressing the "Commissioner of Patents, Washington, D. C."

plurality of normally idle sets of gears each adapted when thrown into service to connect the synthetic register with the common actuating mechanism, said sets of gears having differing ratios of transmission, and means automatically controlled by the connection of the individual registers with the common actuating mechanism for throwing into service that set of gears whose ratio of transmission corresponds with the number of individual registers connected with the actuating mechanism.

6. In combination, a time-controlled member, a plurality of time registers, devices for individually connecting said time registers with said member as desired, and a wage register connected with each connected time register in the ratio of the rate of wages.

7. In combination, a plurality of individual time registers, a clock-governed mechanism for controlling the actuation of any of the time registers connected therewith, means for connecting any of the time registers with the actuating mechanism, and a wage register geared to each time register in the ratio of the rate of wages.

8. In combination, a plurality of individual registers, a synthetic register, means for actuating one or more of the individual registers, and means for automatically actuating the synthetic register at a rate proportional to and varying as the sum of the rates of actuation of the individual registers.

9. In combination, a plurality of individual registers, a synthetic register, means for actuating one or more of the individual registers at a uniform rate, and means for automatically actuating the synthetic register at a rate proportional to and varying as the number of the individual registers concurrently connected with the actuating means.

10. In combination, a plurality of individual registers, a synthetic register, a uniformly driven actuating mechanism, means for connecting one or more of the individual registers with the actuating mechanism, a plurality of transmission gears each adapted to connect the synthetic register with the actuating mechanism, and means for automatically connecting the synthetic register with the actuating mechanism through a transmission gear having a ratio of transmission corresponding with the sum of the rates of actuation of the individual registers.

11. In combination, a plurality of totalizing registers each assigned to a different workman's account, a uniformly driven actuating mechanism, means for operatively connecting any register with the actuating mechanism during the periods of time for which the workman to whom that register is assigned is to be credited, whereby each register will totalize the workman's credits as earned, and means for automatically synthesizing the entries in all of said registers.

12. In combination, a plurality of individual time registers each adapted to be actuated at a common unitary rate of registration, a synthetic time register adapted to be actuated at integrally variant rates of registration with reference to the unitary rate of registration of the individual time registers, a normally disconnected time-controlled actuating means adapted to transmit to any one or more of the individual time registers when operatively connected therewith the unitary rate of registration, and also adapted to transmit to the synthetic time register when operatively connected therewith any one of the integrally variant rates of registration, and means for operatively connecting and disconnecting any one or more of the individual time registers with the common actuating means, and simultaneously and automatically connecting and adjusting the synthetic time register to receive a multiple of the unitary rate of registration corresponding with the number of individual time registers concurrently in operative connection with the common actuating means.

13. In combination, an actuating means adapted to transmit a unitary rate of actuation, a synthetic register adapted to be actuated at a plurality of different rates, one of them being unitary and the other rates being integrally variant with respect to such unitary rate, a plurality of individual registers each adapted to be actuated when connected with the actuating means at a unitary rate of actuation, means for operatively connecting a plurality of the individual registers with the actuating means for intercurrent registration each at the unitary rate, and automatic means for operatively connecting the synthetic register with the actuating means to register at a unitary rate when one of the individual registers is operatively connected with the actuating means, and at an increment of an equal unitary rate for each of the other individual registers concurrently operatively connected with the actuating means.

14. In combination, a plurality of totalizing registers each assigned to a different workman's account, a uniformly driven actuating mechanism, means for operatively connecting any register with the actuating mechanism during the periods of time for which the workman to whom that register is assigned is to be credited, whereby each register will totalize the workman's credits as earned, means for automatically synthesizing the entries in all of said registers, and means for returning said registers to their zero positions.